May 9, 1967
H. A. LIPE
3,318,456
CAR SEAT TRAY
Filed April 9, 1965
2 Sheets-Sheet 1
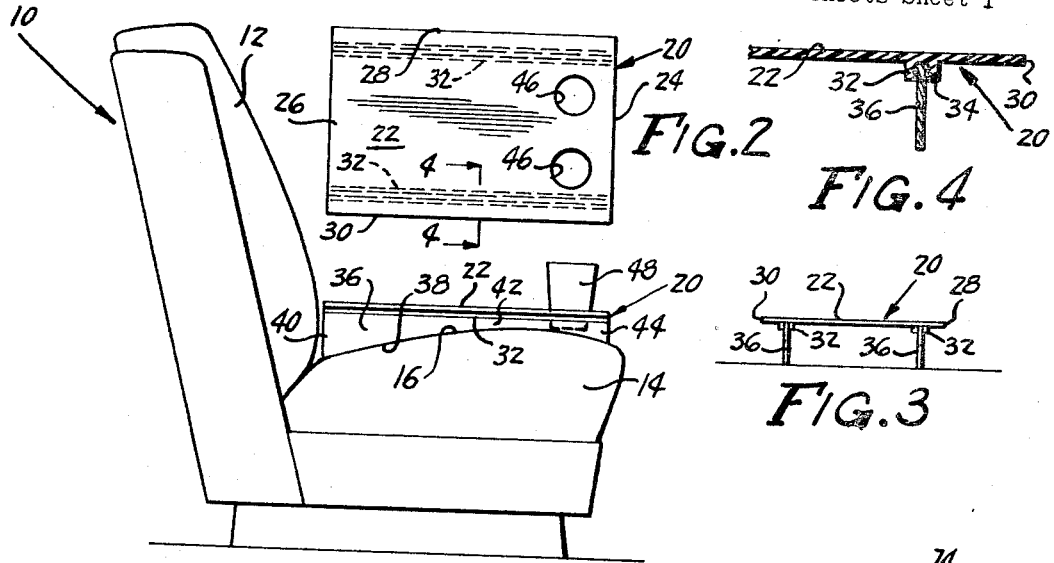
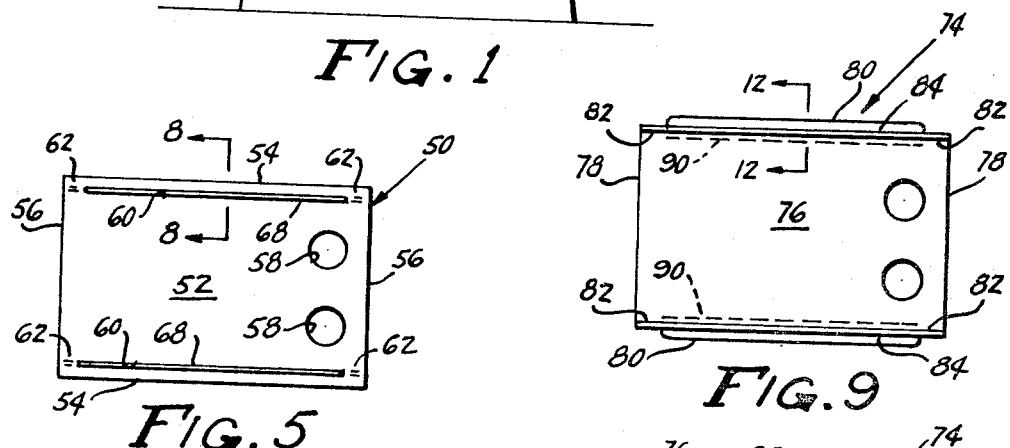
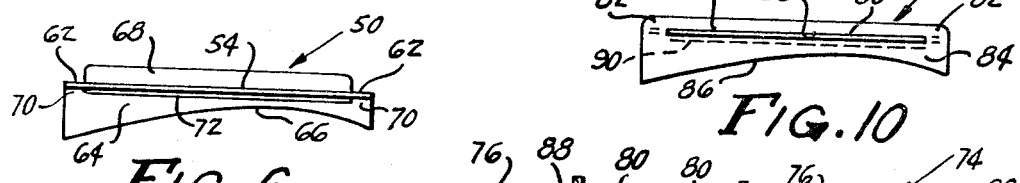
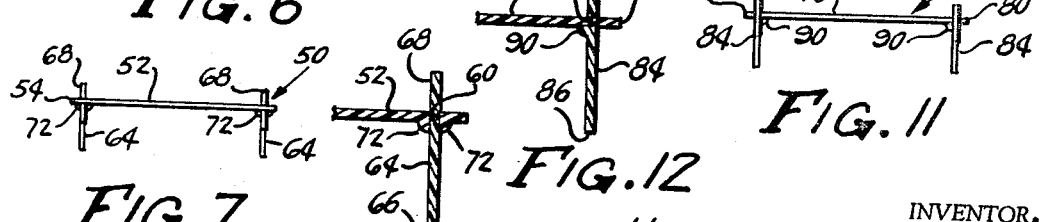
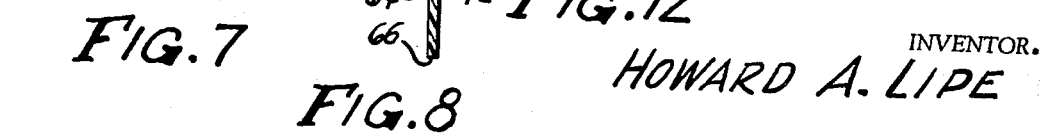
INVENTOR.
HOWARD A. LIPE
BY *Kimmel, Crowell & Weaver*
ATTORNEYS.

May 9, 1967 H. A. LIPE 3,318,456
CAR SEAT TRAY
Filed April 9, 1965 2 Sheets-Sheet 2
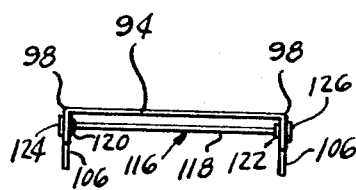
FIG. 14
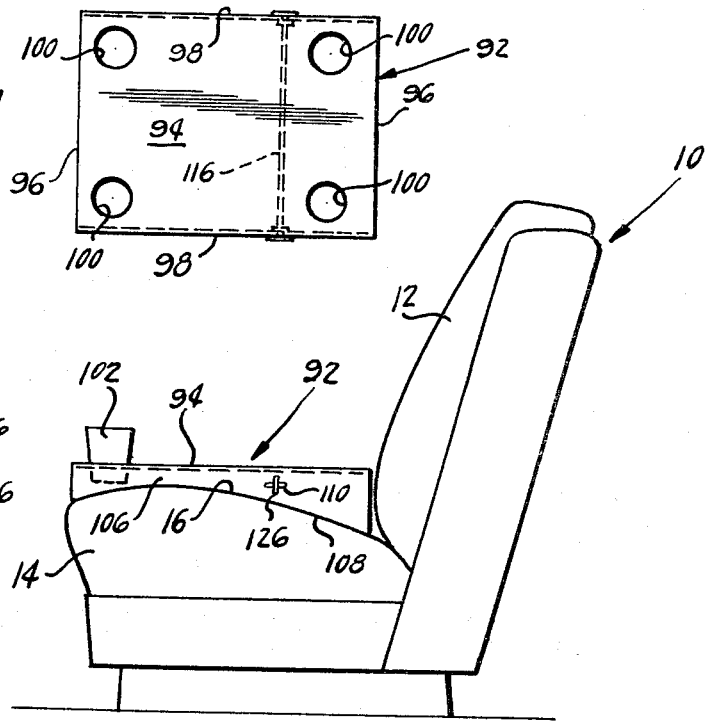
FIG. 15
FIG. 13
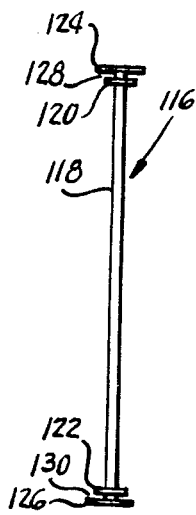
FIG. 17
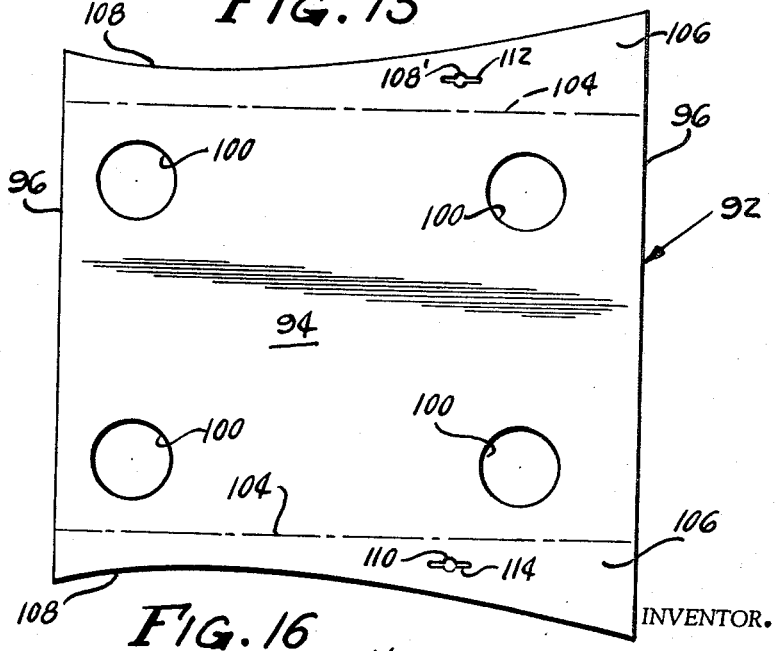
FIG. 16
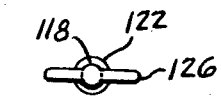
FIG. 18
INVENTOR.
HOWARD A. LIPE
BY Kimmel, Crowell & Weaver
ATTORNEYS.

United States Patent Office 3,318,456
Patented May 9, 1967

3,318,456
CAR SEAT TRAY
Howard A. Lipe, 2600 Keating St., Apt. 408,
Washington, D.C. 20031
Filed Apr. 9, 1965, Ser. No. 446,869
8 Claims. (Cl. 211—72)

This invention relates to car seat trays, and more particularly to a tray having depending spaced apart support means, the bottom edges of which are adapted to fit upon the curved seat of an automobile and the upper surface of which is configured to receive paper cups and the like.

It has been known in the art to provide a removable tray having a bottom surface configured to fit the curved seat of an automobile and having an upper surface into which soft drink cups and the like may be placed. Trays known to the prior art have several disadvantages, one of which is that they are large bulky devices requiring a large storage space. Another disadvantage of the trays known to the prior art is that they are expensive to make, thus preventing operators of drive-in eating establishments from dispensing them to patrons.

It is accordingly a primary object of the instant invention to provide a light weight, sturdy car seat tray having an under surface which conforms to the arcuate upper surface of an automobile seat which may be readily assembled and disassembled and requiring little storage space in the disassembled condition.

It is another object of this invention to provide a car seat tray having a planar surface and a plurality of depending support members presenting an arcuate bottom edge.

It is a more specific object of the instant invention to provide a car seat tray made of plastic or reinforced fibreboard having a planar surface and a plurality of removable depending support members presenting an arcuate bottom edge.

Another object of this invention is to provide a car seat tray having a planar surface which is bounded on two lateral edges by an upstanding ridge to prevent the accidental dislodgement of a sandwich or the like from the planar surface.

It is another more specific object of this invention to provide a car seat tray made of one piece fibreboard.

Another object of this invention is to provide a car seat tray having support portions which may be formed from an initial planar member.

Another object of the instant invention is to provide a car seat tray having a transverse support means providing a rigid connection between a pair of vertical supports.

Other objects and advantages of the instant invention reside in the combinations of elements, arrangements of parts, and features of construction, all as will be more fully pointed out hereinafter and disclosed in the accompanying drawings wherein there is disclosed several preferred embodiments of this inventive concept.

In the drawings:

FIGURE 1 is a side elevational view of an automobile seat on which is positioned a car seat tray made in accordance with the principles of the instant invention;

FIGURE 2 is a plan view of the car seat tray shown in FIGURE 1;

FIGURE 3 is an end elevational view of the device shown in FIGURE 2;

FIGURE 4 is a partial sectional view of the device of FIGURE 2 taken along line 4—4 thereof and viewing in the direction of the arrows;

FIGURE 5 is a plan view of another car seat tray embodying the principles of the instant invention;

FIGURE 6 is a side elevational view of the device of FIGURE 5;

FIGURE 7 is an end elevational view of the device shown in FIGURES 5 and 6;

FIGURE 8 is a partial sectional view of the device shown in FIGURE 5 taken along line 8—8 thereof and viewing in the direction of the arrows;

FIGURE 9 is a plan view of another car seat tray embodying the principles of the instant invention;

FIGURE 10 is a side elevational view of the device of FIGURE 9;

FIGURE 11 is an end elevational view of the device shown in FIGURES 9 and 10;

FIGURE 12 is a partial sectional view taken along line 12—12 in FIGURE 9 viewing in the direction of the arrows;

FIGURE 13 is a side elevational view of an automobile seat on which is positioned a one piece car seat tray made in accordance with the principles of the instant invention;

FIGURE 14 is a plan view of the car seat tray indicated in FIGURE 13;

FIGURE 15 is an end elevational view of the device shown in FIGURE 14;

FIGURE 16 is a preformed blank of material from which the car seat tray of FIGURES 14 and 15 may be formed;

FIGURE 17 is a plan view of a transverse supporting member which is used in conjunction with the blank of material shown in FIGURE 16 to construct the finished car seat tray; and FIGURE 18 is an end elevational view of the transverse support means shown in FIGURE 17.

Referring now to the drawings, wherein like reference characters designate like elements throughout the several views thereof, and particularly to FIGURES 1 to 4 inclusive, there is indicated generally at 10 a conventional bench type automobile seat comprised of a back rest 12 and a lower cushion 14 having a conventional arcuate upper surface 16. A car seat tray indicated generally at 20 is comprised of a substantially horizontal planar section 22, which may be of any desired configuration, but which is shown as rectangular having front and rear edges 24, 26 and lateral edges 28, 30.

Secured to or integral with the lower surface of planar section 20 is an elongated block 32 adjacent each lateral edge 28, 30 having a longitudinally extending groove 34 therein. Slidably disposed in groove 34 of each block 32 is a vertically depending support 36 having an arcuate lower surface 38 complementary with arcuate upper surface 16 of seat 10.

As shown in FIGURE 1 depending support 36 is of a maximum height at rear end 40 thereof and at minimum height at 42 and at an intermediate height at forward end 44 in order to maintain thin planar section 22 horizontal when car seat tray 20 is placed on lower cushion 14. As shown in FIGURES 1 and 2 planar surface 22 is provided with a number of apertures 46 placed adjacent the forward end of planar surface 22 for the convenient reception of a soft drink cup 48 or the like.

Referring now to FIGURES 5 to 8 inclusive, there is indicated generally at 50 a car seat tray similar to that previously disclosed comprising a food receiving surface 52 bounded by a pair of lateral edges 54 and a pair of end edges 56 and equipped with apertures 58 for the convenient reception of a cup or the like. Surface 52 provides a pair of substantially parallel slots 60 adjacent lateral edges 54 which longitudinally extend less than the entire distance between end edges 56. A small unslotted surface 62 is provided adjacent each corner of surface 52 in order to support a shoulder of a dependingly attached support member 64 as hereinafter described.

Support 64 is of similar configuration to support 36, providing an arcuate lower surface 66 and an upwardly extending tab 68 which is of lesser longitudinal extent than support 64. Tab 68 extends through slot 60 of a planar surface 62 with a pair of forward and rearward shoulders 70 providing a means on which planar surface 52 may rest. As shown in FIGURE 8 a pair of fillets 72 may be provided on the under surface of section 52 adjacent slot 60 for increased structural strength.

Referring now to FIGURES 9 to 12 inclusive there is indicated generally at 74 a car seat tray, similar to tray 50, comprising a food retaining surface 76 bounded by parallel edges 78 on the ends and providing a tab 80 on the sides thereof. As shown in FIGURE 9 tab 80 is of lesser length than section 76 thus providing a series of shoulders 82 against which a pair of vertically depending supports 84 may rest. Supports 84 are configured similarly to those previously discussed having an arcuate under surface 86 and providing a slot 88 through which tab 80 may extend so that support 84 abuts shoulders 82. A fillet 90 may be provided on inner or outer surfaces of support 84 beneath slot 88 to enhance the rigidity of the assembled car seat tray 74.

It is understood that the car seat tray heretofore discussed may be made of any convenient material, but it has been found advantageous to make it of a plastic or reinforced fibreboard.

Referring now to FIGURES 13 to 18 inclusive, there is indicated an automobile seat 10 having the structural features previously mentioned. Resting on arcuate upper surface 16 of lower cushion 14 is another embodiment of a car seat tray indicated generally at 92 comprising a horizontal planar surface 94 bounded by end edges 96 and lateral edges 98 and providing a series of apertures 100 for the convenient reception of a drinking cup 102 as previously explained.

Car seat tray 92 is preferably made of a fibreboard material weakened along parallel lines 104, as by scoring or intermittent slotting, to provide a pair of supports 106 which may be bent along score line 104 to provide the rectangular shaped surface 94 as shown in FIGURE 14. Support 106 comprises a lower arcuate surface 108 configured so that surface 94 is horizontal when car seat tray 92 is placed on lower cushion 14.

It has been found that support members 106 will not retain a perpendicular relationship with planar surface 94 when a load is placed thereon. Accordingly, there is provided in support members 106 a pair of transversely aligned apertures 108, 110 each of which intersects an elongated slot 112, 114. FIGURE 17 shows a transverse stiffening or supporting member indicated generally at 116 having a central cylindrical elongated stiffening rod 118, which may be of plastic or the like, with a washer 120, 122 secured adjacent but slightly removed from each end thereof. Secured to each end of rod 118 in any conventional manner is an elongated key 124, 126 which also may be of plastic. Thus each end of rod 118 is equipped with a support receiving groove 128, 130.

In assembling car seat tray 92 the preformed blank of material shown in FIGURE 16 is grasped and each support 106 is bent downwardly along score lines 104. Transverse support 116 is placed under planar section 94 with keys 124, 126 aligned with slots 112, 114. Each support 106 is pressed inwardly until it fits within support receiving grooves 128, 130 at which time rod 118 is rotated to position keys 124, 126 out of alignment with slots 112, 114. Thus supports 106 are rigidly fixed and will not spread upon the placement of a load on planar surface 94.

From the foregoing, it will now be seen that there is herein provided a car seat tray which accomplishes all of the objects of this invention and others, including many advantages of great practical utility and commercial importance.

As many embodiments may be made within this inventive concept, and as many modifications may be made in the embodiment hereinbefore shown and described, it is to be understood that all matter herein is to be interpreted merely as illustrative and not in a limiting sense. One such modificatin within the scope of this invention is the provision of depending supports having an arcuate bottom edge on the customary fibreboard containers dispensed by drive-in establishments to their patrons.

I claim:

1. A car seat tray comprising a substantially planar surface having lateral edges and forming at least one aperture for the reception of a cup; depending spaced apart support means for holding said planar surface substantially horizontal on a bench type automobile seat, said support means comprising two spaced apart elongated support members, each having a substantially planar support edge and a concave lower edge configured to conform to a cross section of the upper surface of a bench type car seat taken longitudinally of a car, and means connecting each of said support members to said planar surface adjacent said lateral edges, said support members being integral with and forming a continuation of said planar surface.

2. The structure of claim 1 wherein there is provided a stiffening means for said downwardly extending support members.

3. The structure of claim 2 wherein said stiffening means comprises a transversely extending rod secured to each of said support members.

4. The structure of claim 3 wherein said support members are provided with a pair of horizontally aligned apertures for the reception of said stiffening rod.

5. The structure of claim 4 wherein each of said support members forms an elongated slot intersecting said aperture, and said stiffening rod provides a complementarily shaped key for insertion into said elongated slot.

6. The structure of claim 5 wherein an enlarged washer is secured to said stiffening rod interiorly of said complementarily shaped key.

7. A planar fibreboard section bounded by two substantially parallel edges and a first and second arcuate edge, said second arcuate edge being a mirror image of said first arcuate edge, said planar surface being provided with a pair of substantially parallel longitudinally weakened fold lines substantially perpendicular to said parallel edges interiorly of said arcuate edges, said planar section forming at least one aperture interiorly of said fold lines for the reception of a cup.

8. The structure of claim 7 wherein each portion bounded by said parallel edges and said fold lines contains an aperture equi-distant from one of said parallel edges and equi-distant from said fold lines.

References Cited by the Examiner

UNITED STATES PATENTS

| | | | |
|---|---|---|---|
| D. 199,993 | 1/1965 | Cohen | 108—44 X |
| 2,568,677 | 9/1951 | Adelson | 211—72 |
| 2,732,994 | 1/1956 | Anderson | 206—72 X |
| 2,897,974 | 8/1959 | Cook | 108—44 X |
| 3,048,457 | 8/1962 | Haase | 108—44 X |
| 3,163,287 | 12/1964 | Barnett | 108—44 X |
| 3,244,125 | 4/1966 | Mackey | 108—44 |

JOHN PETO, *Primary Examiner.*

CLAUDE A. LE ROY, *Examiner.*

W. D. LOULAN, *Assistant Examiner.*